UNITED STATES PATENT OFFICE 2,592,617

S-(ETHYLXANTHOYL) PIPERIDYL THIOPHOSPHORIC CHLORIDE

Henry Tolkmith, Midland, Mich., assignor to The Dow Chemical Company, Midland, Mich., a corporation of Delaware No Drawing. Application December 30, 1950, Serial No. 203,765

1 Claim. (Cl. 260—293.4)

This invention is directed to S-(ethylxanthoyl) piperidyl thiophosphoric chloride of the formula

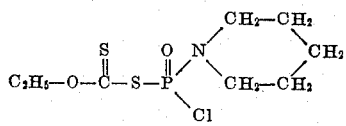

This compound is a viscous oil, somewhat soluble in many organic solvents and substantially insoluble in water. The new compound is of value as an intermediate for the preparation of more complex organic derivatives and as a constituent of parasiticide compositions.

The new compound may be prepared by reacting an alkali metal ethylxanthate with piperidyl phosphoric dichloride of the formula

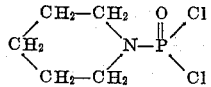

in an inert organic solvent such as benzene. Sodium ethylxanthate is preferably employed. In practice, good results are obtained when employing substantially equimolecular proportions of the reactants.

In carrying out the reaction, the sodium ethylxanthate, piperidyl phosphoric dichloride and solvent are mixed together and the resulting mixture heated with stirring for a period of time at a temperature of from 40° to 80° C. Temperatures substantially in excess of 80° C. for any appreciable period of time are to be avoided as the desired product has a tendency to decompose at such temperature. Upon completion of the reaction, the mixture may be filtered and the filtrate concentrated by distillation under reduced pressure at gradually increasing temperatures to a temperature up to 80° C. to separate low boiling constituents and to obtain as a residue the desired S-(ethylxanthoyl) piperidyl thiophosphoric chloride.

The piperidyl phosphoric dichloride employed as a starting material in the above-described method may be prepared by reacting phosphorus oxychloride ($POCl_3$) with piperidine. Satisfactory yields are obtained when employing two molecular proportions of piperidine with one molecular proportion of phosphorus oxychloride. The reaction takes place readily at temperatures of from 0° to 40° C. The reaction is somewhat exothermic, the temperatures being controlled by regulation of the rate of contacting the reactants as well as by the addition or subtraction of heat, if required. Following the reaction, the mixture may be filtered and the filtrate fractionally distilled under reduced pressure to separate the desired product. The latter is a water-like liquid boiling at 257° C. at 760 millimeters pressure.

In a representative preparation, 35 grams (0.24 mole) of sodium ethylxanthate was added to 47.5 grams (0.24 mole) of piperidyl phosphoric dichloride dispersed in 100 milliliters of benzene and the resulting mixture heated with stirring for 3 hours at a temperature of 60° C. The mixture was then filtered and the filtrate concentrated by distillation under reduced pressure to a temperature up to 60° C. to obtain as a residue 47.3 grams of an S-(ethylxanthoyl) piperidyl thiophosphoric chloride product. The latter was a viscous oil having a density of 1.230 at 18° C.

I claim:

S-(ethylxanthoyl) piperidyl thiophosphoric chloride.

HENRY TOLKMITH.

No references cited.